(12) United States Patent
Wang

(10) Patent No.: US 10,054,193 B2
(45) Date of Patent: Aug. 21, 2018

(54) UNI-DIRECTIONAL DRIVE GEAR AND A GEAR TRANSMISSION DEVICE WITH THE SAME

(71) Applicant: Shuo-Yu Wang, Miaoli (TW)

(72) Inventor: Shuo-Yu Wang, Miaoli (TW)

(*) Notice: Subject to any disclaimer, the term of this patent is extended or adjusted under 35 U.S.C. 154(b) by 0 days.

(21) Appl. No.: 15/638,454

(22) Filed: Jun. 30, 2017

(65) Prior Publication Data

US 2018/0156312 A1 Jun. 7, 2018

(30) Foreign Application Priority Data

Dec. 7, 2016 (TW) ............................. 105218657 U

(51) Int. Cl.
| | | |
|---|---|---|
| *F16H 1/00* | (2006.01) | |
| *G01F 15/07* | (2006.01) | |
| *F16H 29/16* | (2006.01) | |
| *F16H 29/22* | (2006.01) | |

(52) U.S. Cl.
CPC ............ *F16H 1/003* (2013.01); *F16H 29/16* (2013.01); *G01F 15/07* (2013.01); *F16H 1/006* (2013.01); *F16H 29/22* (2013.01)

(58) Field of Classification Search
CPC .......... F16H 1/003; F16H 29/16; F16H 29/22; F16H 1/006; G01F 15/07
USPC ...... 74/409, 415, 425, 440, 457–468, 665 L; 475/180, 344–347
See application file for complete search history.

(56) References Cited

U.S. PATENT DOCUMENTS

| | | | | |
|---|---|---|---|---|
| 548,551 A | * | 10/1895 | Huffman ................. | B23Q 5/32 74/461 |
| 782,628 A | * | 2/1905 | Taylor ..................... | B61C 11/04 295/4 |
| 1,744,576 A | * | 1/1930 | Rhett ...................... | F16H 55/16 74/339 |
| 4,434,682 A | * | 3/1984 | Fickelscher ............... | F16H 1/32 74/640 |
| 4,449,425 A | * | 5/1984 | Carden ..................... | F16H 1/32 475/180 |
| 4,543,841 A | * | 10/1985 | Ju ............................. | F16H 1/24 74/461 |
| 4,913,567 A | * | 4/1990 | Imamaki ................. | B41J 25/312 74/461 |
| 5,046,378 A | * | 9/1991 | Bannister ................ | F16H 27/08 74/461 |
| 5,454,766 A | * | 10/1995 | Mills ....................... | F16H 29/16 475/180 |
| 8,656,809 B2 | * | 2/2014 | Bayer ..................... | F16H 25/06 74/640 |
| 8,726,753 B2 | * | 5/2014 | Yang ....................... | F16H 55/16 74/409 |
| 2010/0301609 A1 | * | 12/2010 | Kim ....................... | F03B 17/065 290/54 |
| 2012/0073395 A1 | * | 3/2012 | Yang ....................... | F16H 55/16 74/409 |

* cited by examiner

*Primary Examiner* — Victor L MacArthur
(74) *Attorney, Agent, or Firm* — Trop Pruner & Hu, P.C.

(57) ABSTRACT

A uni-directional drive gear includes a plurality of teeth each pivotably mounted on a mounting seat to be turned between driving and idle positions so as to permit the gear to rotate in a uni-rotational direction. A gear transmission device having the uni-directional drive gear can be configured to perform different transmissions to suit a wide variety of requirements.

9 Claims, 12 Drawing Sheets

UNI-DIRECTIONAL DRIVE GEAR AND A GEAR TRANSMISSION DEVICE WITH THE SAME

CROSS-REFERENCE TO RELATED APPLICATION

This application claims priority of Taiwanese Patent Application No. 105218657, filed on Dec. 7, 2016.

FIELD

The disclosure relates to a gear transmission apparatus, and more particularly to a uni-directional drive gear and a gear transmission device with the same.

BACKGROUND

Gears are widely used in a mechanical transmission device (such as a watch, a mechanical equipment, etc.) to transmit torques, to change rotational directions, or to change rotational speeds, etc.

Referring to FIG. 1, a conventional gear transmission device 10 includes a driving gear 11 and a plurality of driven gears 12 meshing with the driving gear 11. Each of the driving and driven gears 11, 12 has a main body 111, 121 and a plurality of teeth 112, 122 formed on and extending radially and outwardly from the main body 111, 121. Rotation of the driving gear 11 results in rotation of each driven gear 12 in an opposite rotational direction. Hence, the driven gears 12 cannot be disposed to mesh with each other, which impose a limit on the transmission of the device 10 and the device 10 may not be able to meet requirements for different applications. For example, to provide the driven gears 12 with rotation in different rotational directions, an extra gear (not shown) is needed to interconnect two of the driven gears 12, which increases the manufacturing cost of the gear transmission device 10 and renders the gear transmission device 10 bulky.

SUMMARY

Therefore, an object of the disclosure is to provide a uni-directional drive gear and a gear transmission device with the same that can alleviate at least one of the drawbacks of the prior art.

According to the disclosure, a uni-directional drive gear includes a mounting seat, a plurality of teeth, a plurality of pivot pins and a plurality of biasing members. The mounting seat includes a first, circular body and a second circular body which are attached to and coaxial with each other along an axis. The second circular body has an outer peripheral surface which surrounds the axis, and a plurality of accommodation bores each of which extends from the outer peripheral surface toward the axis to terminate at a bore bottom. Two adjacent ones of the accommodation bores are angularly spaced from each other about the axis by a raised portion. The raised portion has a top surface section at the outer peripheral surface, and a driven surface section and a barrier surface section which are respectively disposed at two opposite sides of the top surface section in a rotational direction and which extend toward the axis to engage the bore bottom. The teeth are respectively mounted in the accommodation bores. Each of the teeth has a tooth top surface section, and leading and trailing surface sections which are respectively disposed at two opposite sides of the tooth top surface section in the rotational direction. The leading surface section faces the driven surface section. Each of the pivot pins extends in a direction of the axis from the first circular body into the respective accommodation bore such that each of the teeth is pivotably mounted on the respective pivot pin to be turnable between a driving position, where the leading surface section abuts against the driven surface section and the accommodation bore has a retreat space between the trailing surface section and the barrier surface section, and an idle position, where the trailing surface section is moved in the retreat space. Each of the biasing members is disposed to bias the respective tooth to the driving position such that a torque applied to the trailing surface section is transmitted by keeping the respective tooth in the driving position to drive rotation of the uni-directional drive gear in the rotational direction, and such that a torque applied to the leading surface section leads to turning of the respective tooth in the retreat space to the idle position.

According to the disclosure, a gear transmission device includes a driving gear rotatable in a clockwise direction, and a plurality of driven gears. Each driven gear is a uni-directional drive gear, and meshes with the driving gear to be rotated by the driving gear in a counterclockwise direction.

According to the disclosure, a gear transmission device includes a driving gear rotatable in both clockwise and counterclockwise directions, a first rotating shaft, a second rotating shaft disposed parallel to the first rotating shaft, and first, second, third and fourth driven gears each being a uni-directional drive gear. The first driven gear is journalled on the first rotating shaft and meshes with the driving gear to be rotated in the counterclockwise direction. The second driven gear is journalled on the second rotating shaft and meshes with the driving gear to be rotated in the clockwise direction. The leading surface section of each tooth of the second driven gear faces the trailing surface section of each tooth of the first driven gear. The third driven gear is journalled on the first rotating shaft. The fourth driven gear is journalled on the second rotating shaft and meshes with the third driven gear such that the trailing surface section of each tooth of the fourth driven gear faces the trailing surface section of each tooth of the third driven gear.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
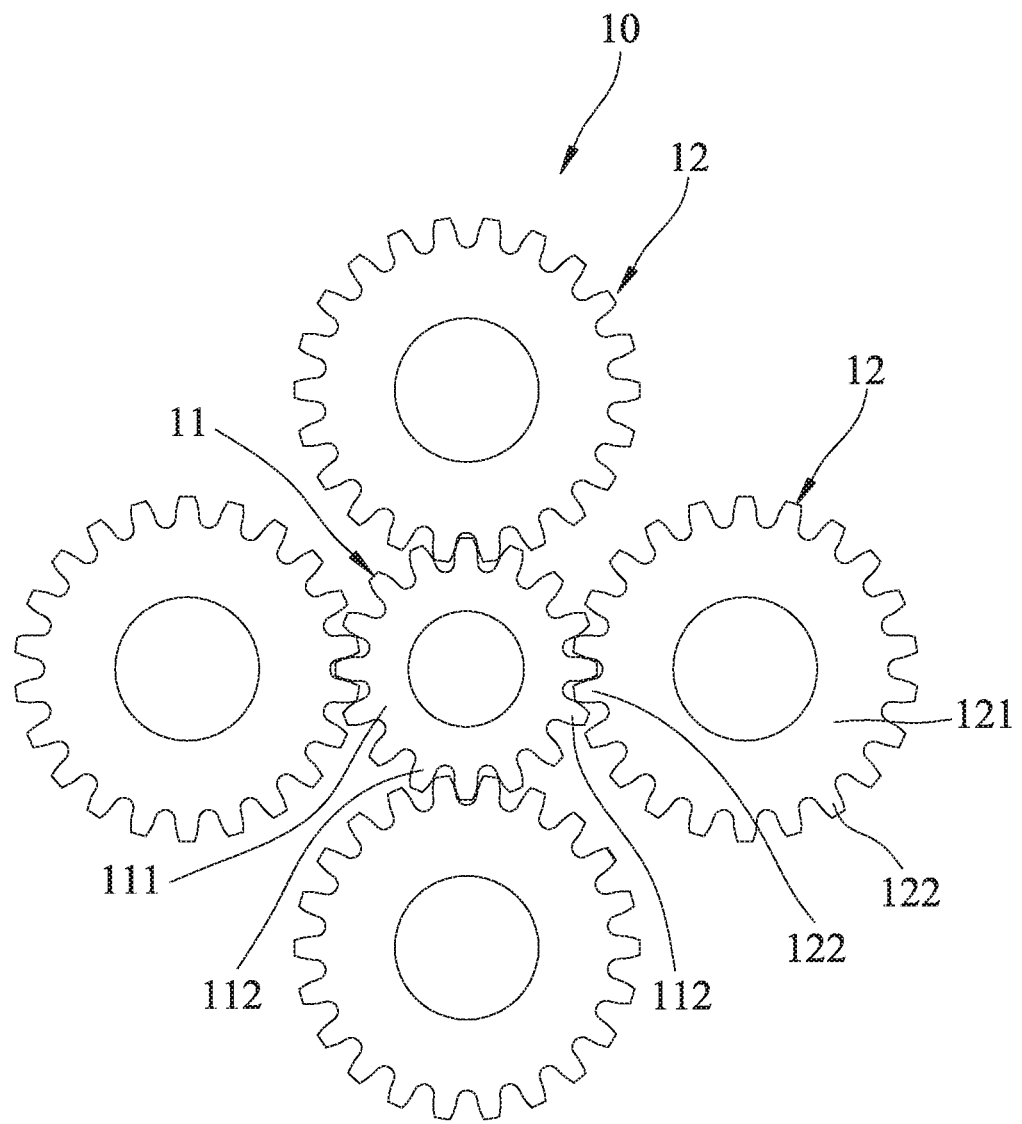
FIG. 1 is a front view of a conventional gear transmission device.
Figure 2:
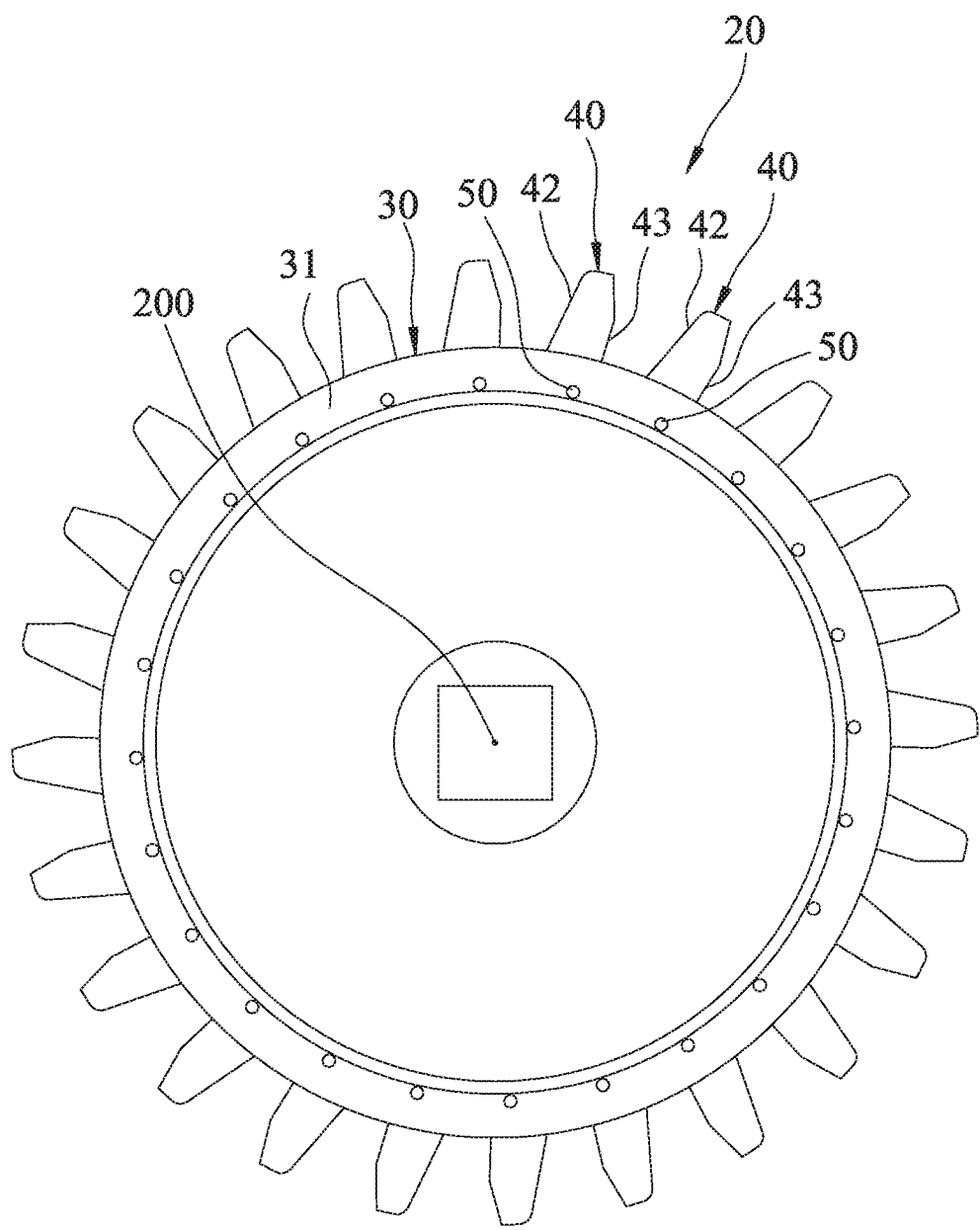
FIG. 2 is a front view illustrating an embodiment of a uni-directional drive gear according to the disclosure.
Figure 3:
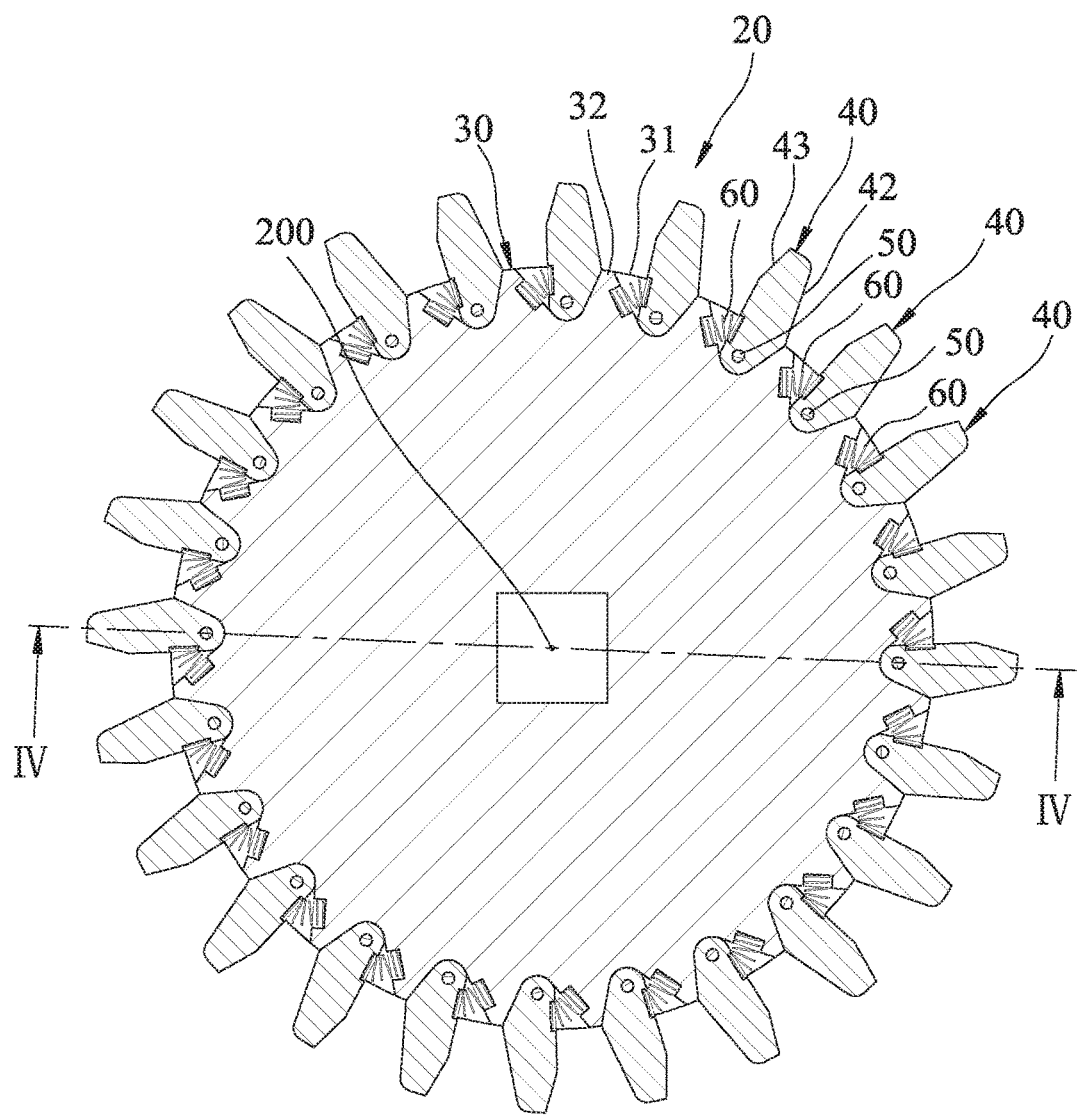
FIG. 3 is a sectional view of the embodiment of the uni-directional drive gear sees from a rear side thereof and rotatable in a clockwise direction.
Figure 4:
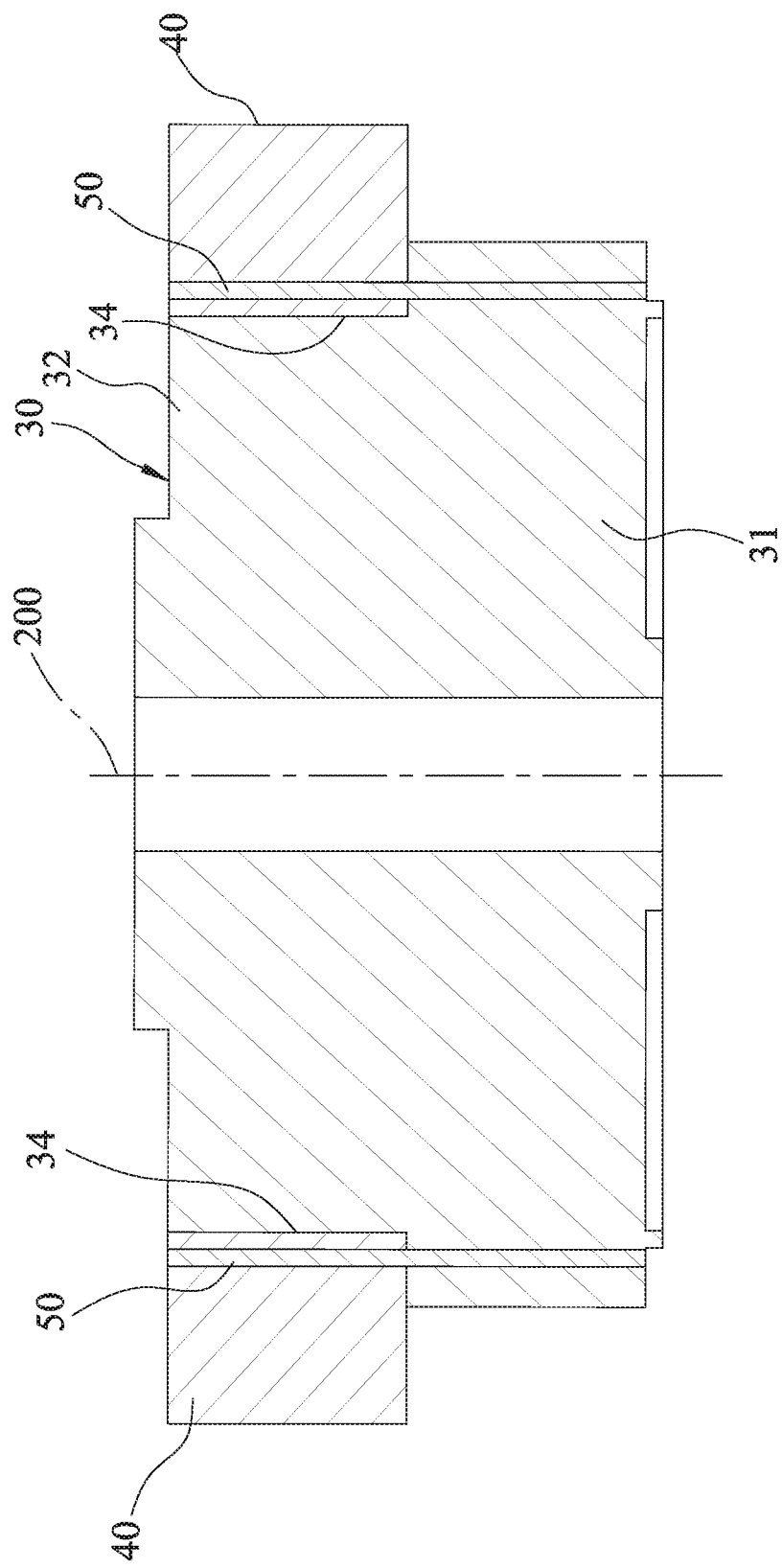
FIG. 4 is a sectional view taken along line IV-IV of FIG. 3.

Before the disclosure is described in greater detail, it should be noted that where considered appropriate, reference numerals or terminal portions of reference numerals have been repeated among the figures to indicate corresponding or analogous elements, which may optionally have similar characteristics. The terms "clockwise" and "counterclockwise" will generally be used to describe the direction viewed from the drawings:

Referring to FIGS. 2 and 3, an embodiment of a uni-directional drive gear 20 includes a mounting seat 30, a plurality of teeth 40, a plurality of pivot pins 50 and a plurality of biasing members 60.

Referring to FIGS. 3 to 6, the mounting seat 30 includes a first circular body 31 and a second circular body 32 which are attached to and coaxial with each other along an axis 200. The second circular body 32 has an outer peripheral surface 33 which surrounds the axis 200, and a plurality of accommodation bores 34 each of which extends from the outer peripheral surface 33 toward the axis 200 to terminate at a bore bottom 341. Two adjacent ones of the accommodation bores 34 are angularly spaced from each other about the axis 200 by a raised portion 35. The raised portion 35 has a top surface section 351 at the outer peripheral surface 33, and a driven surface section 352 and a barrier surface section 353 which are respectively disposed at two opposite sides of the top surface section 351 in a rotational direction and which extend toward the axis 200 to engage the bore bottom 341. The first and second circular bodies 31, 32 may be integrally formed as a single piece, or may be two component parts which are attached to each other.

The teeth 40 are respectively mounted in the accommodation bores 34. Each of the teeth 40 has a tooth top surface section 41, and leading and trailing surface sections 42, 43 which are respectively disposed at two opposite sides of the tooth top surface section 41 in the rotational direction. The leading surface section 42 has a driving region 421 facing the driven surface section 352. Each of the teeth 40 has a chamfer 431 formed at a corner between the trailing surface section 43 and the tooth top surface section 41 to facilitate meshing engagement with the teeth 40 of another uni-directional drive gear 20.

Each of the pivot pins 50 extends in a direction of the axis from the first circular body 31 into the respective accommodation bore 34. Each of the teeth 40 is pivotably mounted on the respective pivot pin 50 to be turnable between a driving position (as shown in FIG. 6), where the driving region 421 of the leading surface section 42 abuts against the driven surface section 352 and the accommodation bore 34 has a retreat space 70 between the trailing surface section 43 and the barrier surface section 353, and an idle position (as shown in FIG. 7), where the trailing surface section 43 is moved in the retreat space 70.

Each of the biasing members 60 is disposed to bias the respective tooth 40 to the driving position, such that a torque (F1) applied to the trailing surface section 43 (see FIG. 6) is transmitted by keeping the respective tooth 40 in the driving position to drive rotation of the uni-directional drive gear 20 in the rotational direction. On the other hand, a torque (F2) applied to the leading surface section 42 (see FIG. 7) leads to turning of the respective tooth 40 in the retreat space 70 to the idle position.

Figure 5:
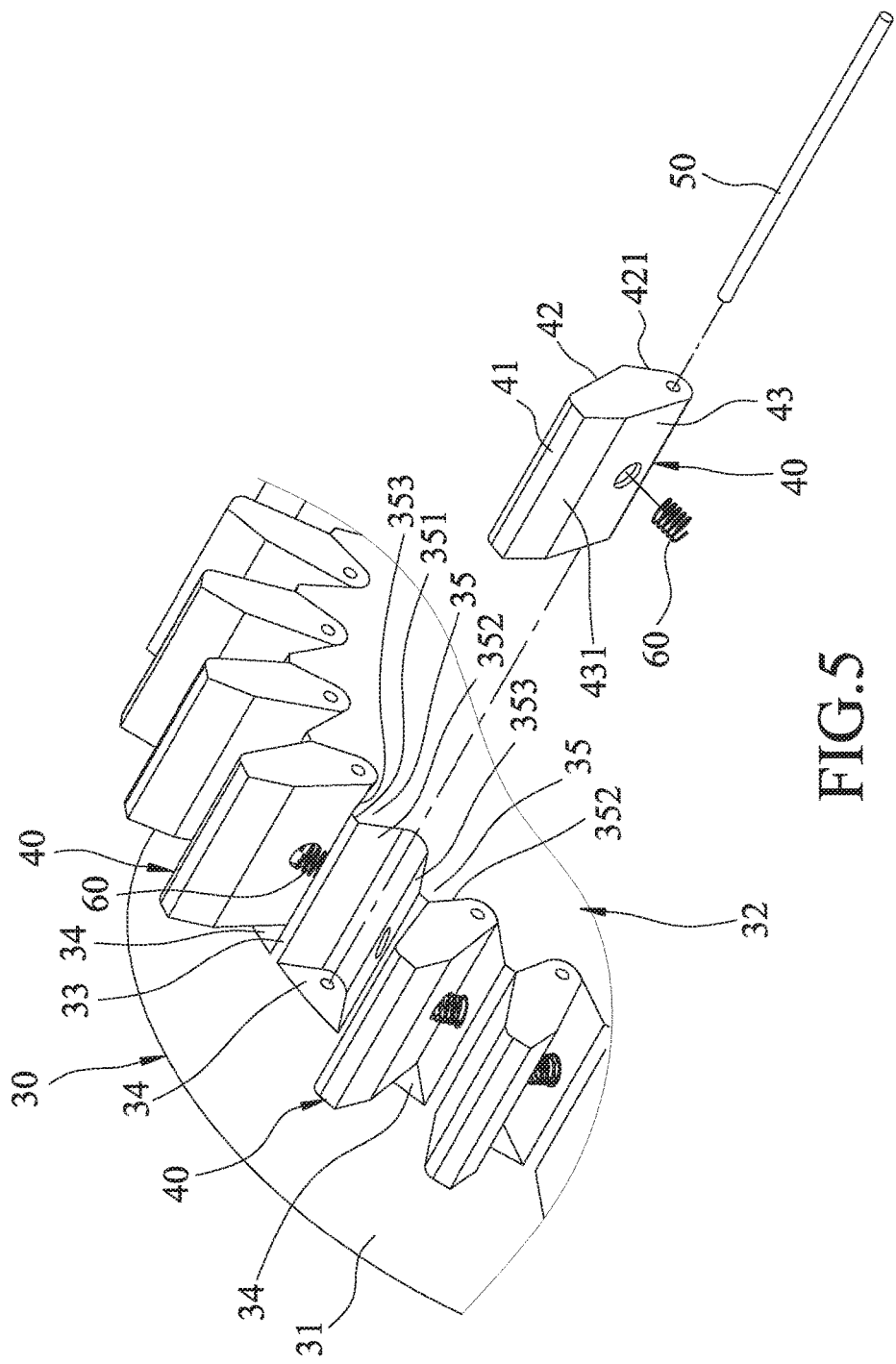
FIG. 5 is a fragmentary, partly exploded perspective view illustrating a tooth of the embodiment of the uni-directional drive gear mounted on a mounting seat by means of a pivot pin.
Figure 6:
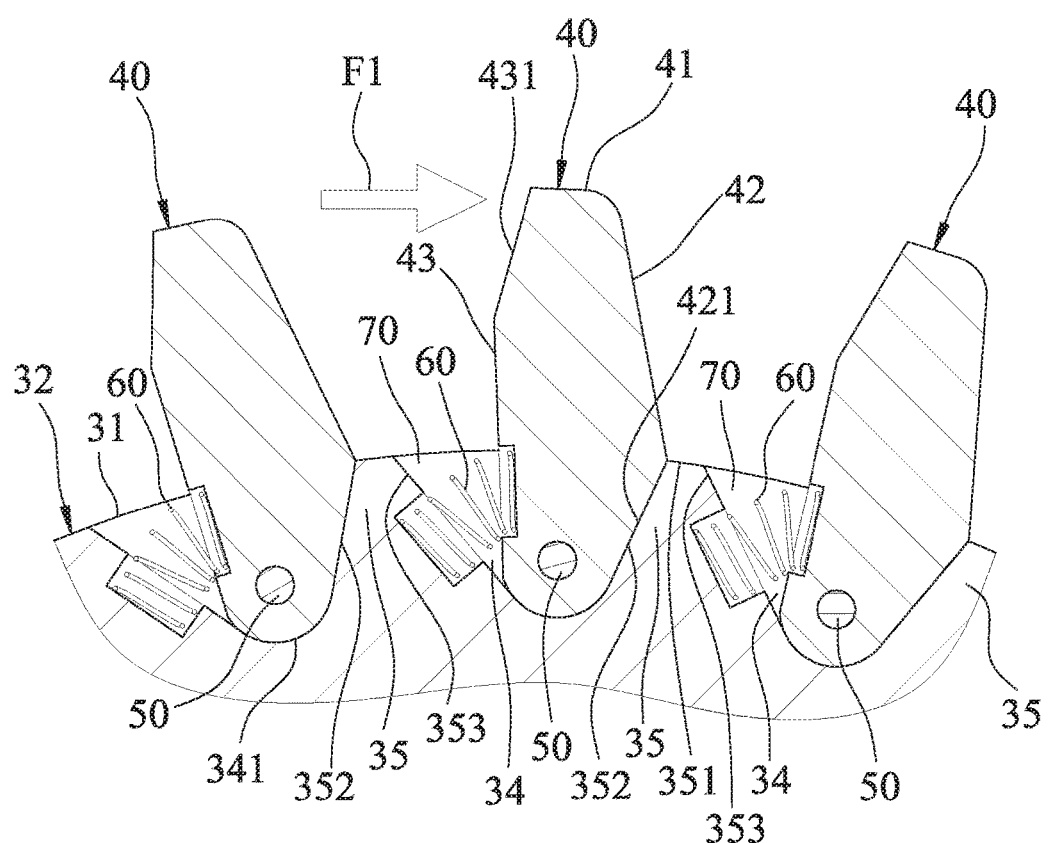
FIG. 6 is a fragmentary sectional view illustrating the tooth in a driving position and seen from a front side thereof.
Figure 7:
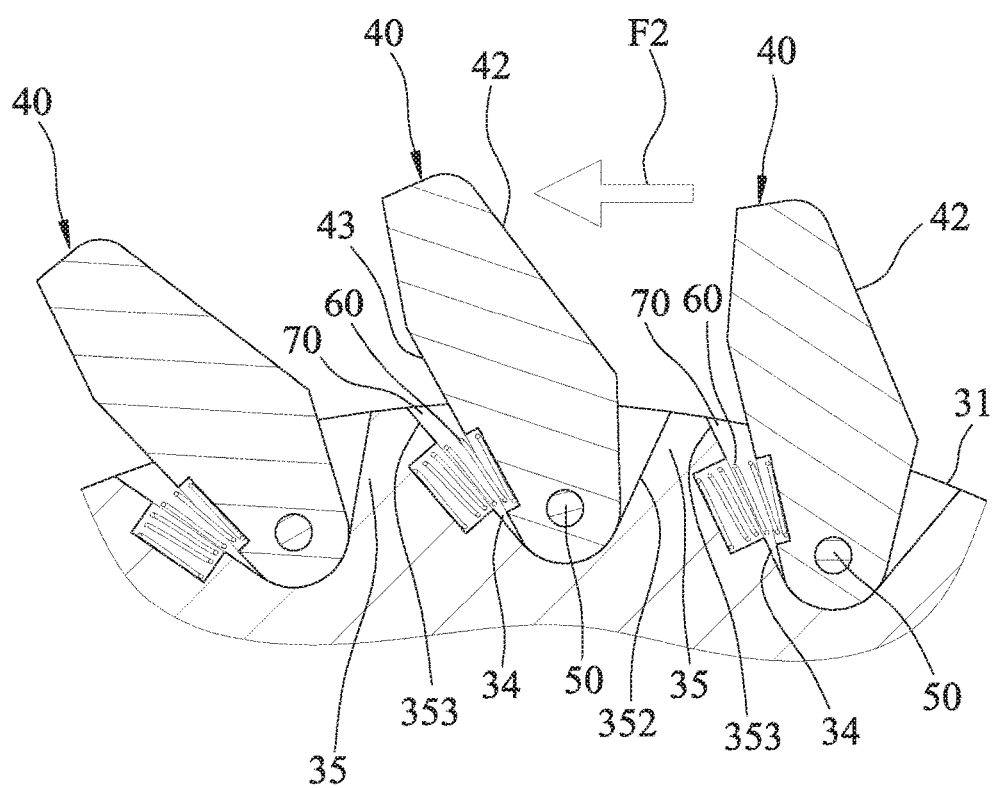
FIG. 7 is a view similar to FIG. 6, illustrating the tooth turned toward an idle position.

With reference to FIGS. 5 and 6, each biasing member 60 may be a compression spring which is disposed in the retreat space 70 and which has two ends abutting against the trailing surface section 43 and the barrier surface section 353, respectively. Moreover, the trailing surface section 43 and the barrier surface section 353 may have recesses for receiving and retaining the ends of the biasing member 60.

Alternatively, each biasing member 60 may be a coil spring (not shown) which is accommodated in a spring receiving space formed in the respective tooth 40, which surrounds the respective pivot pin 50 and which has two leg ends that are securely connected to the respective tooth 40 and the adjacent raised portion 35 to provide a biasing force to the respective tooth 40 toward the driving position.

As shown in FIG. 6, when the trailing surface section 43 of the tooth 40 is subjected to a torque (F1), the driving region 421 is urged to abut against the driven surface section 352 and to rotate the uni-directional drive gear 20 in a clockwise direction.

As shown in FIG. 7, when the leading surface section 42 of the tooth 40 is subjected to a torque (F2), the tooth 40 is pressed toward the barrier surface section 353 to the idle position against, the biasing force of the biasing member 60. During the turning of the tooth 40, the tooth 40 is restricted by the barrier surface section 353 to avoid excess turning thereof.

Figure 8:
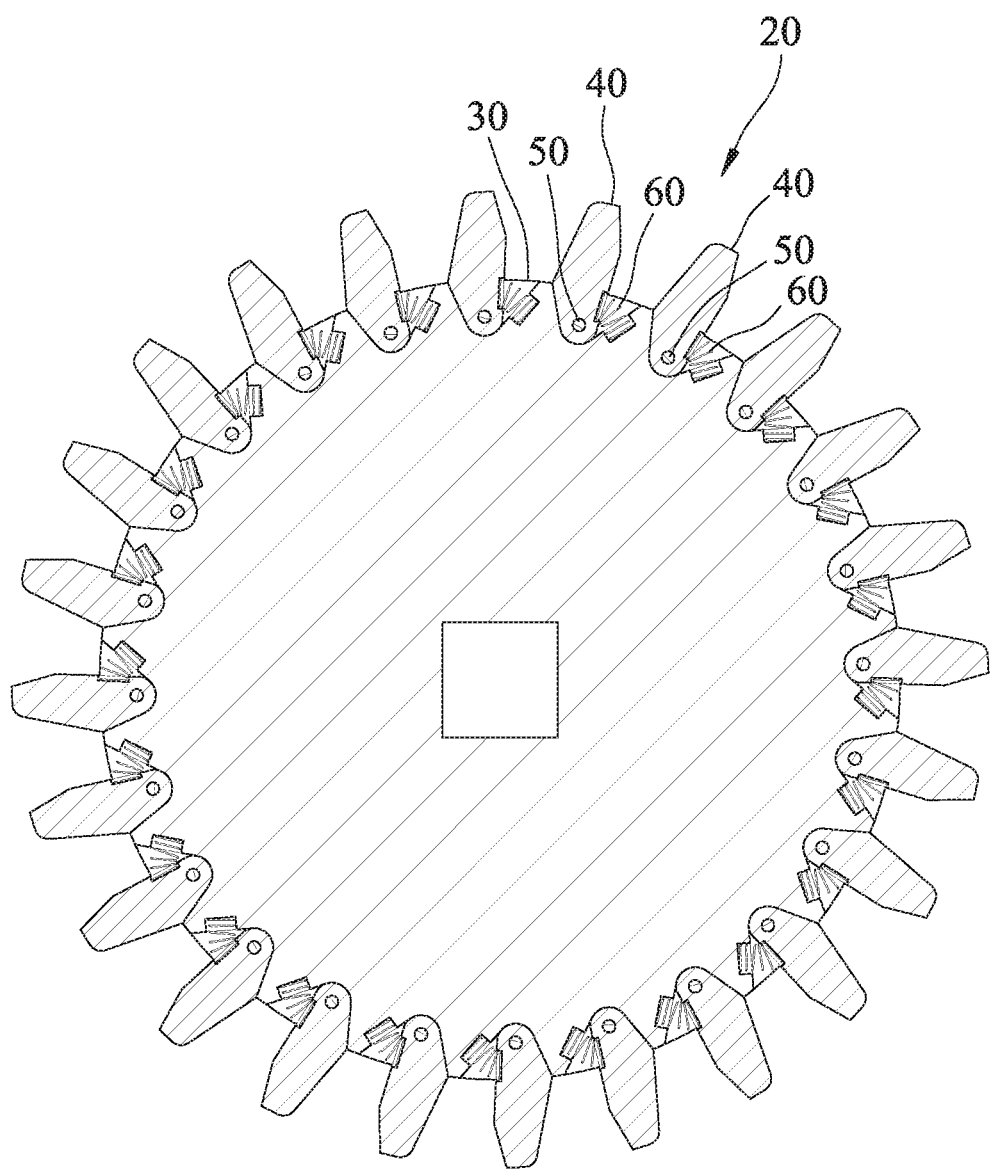
FIG. 8 is a view similar to FIG. 3, illustrating the uni-directional drive gear rotatable in a counterclockwise direction.

The uni-directional drive gear 20 of the disclosure may be disposed to be rotatable in a clockwise direction, as shown in FIG. 3, and also to be rotatable in a counterclockwise direction, as shown in FIG. 8.

By means of the teeth 40 of the uni-directional drive gear 20 turnable between the driving and idle positions, the uni-directional drive gear 20 can be widely employed in a variety of gear transmission devices.

Figure 9:
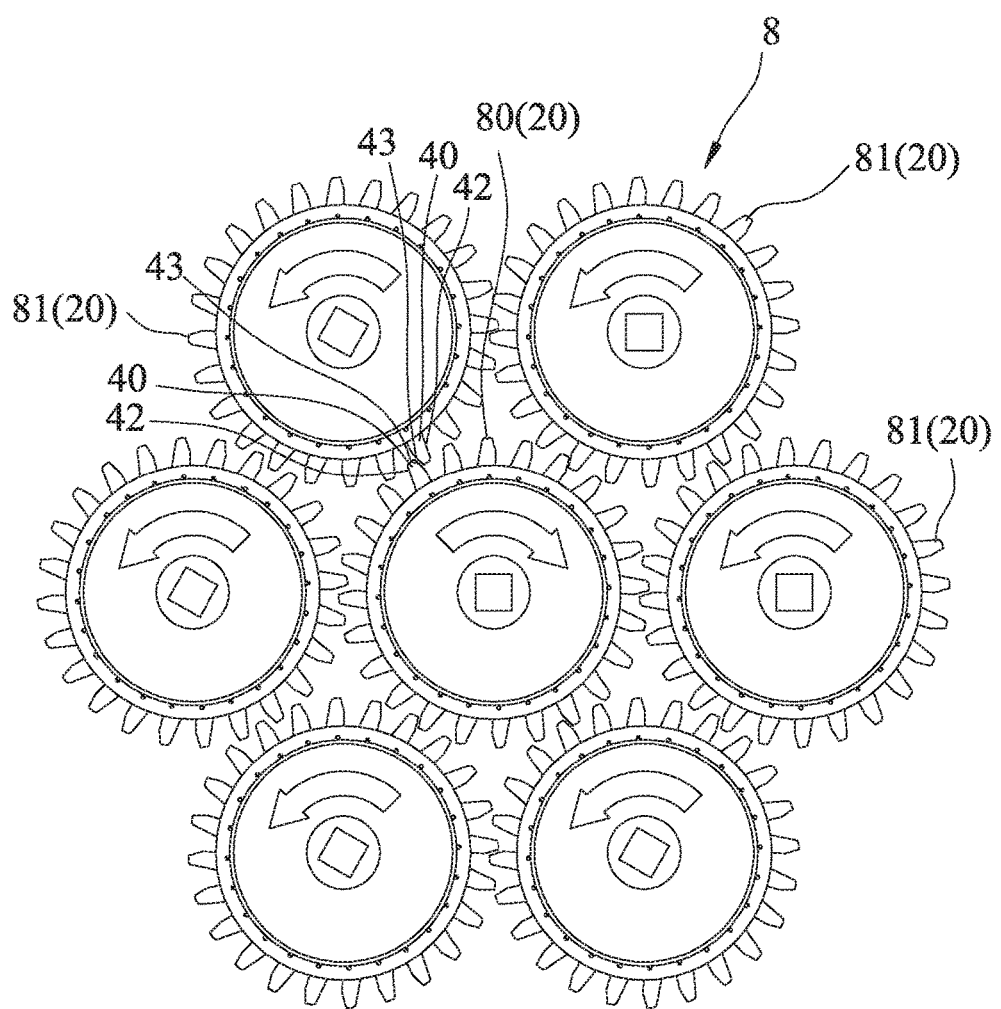
FIG. 9 is a schematic front view illustrating an embodiment of a gear transmission device according to the disclosure.
Figure 10:
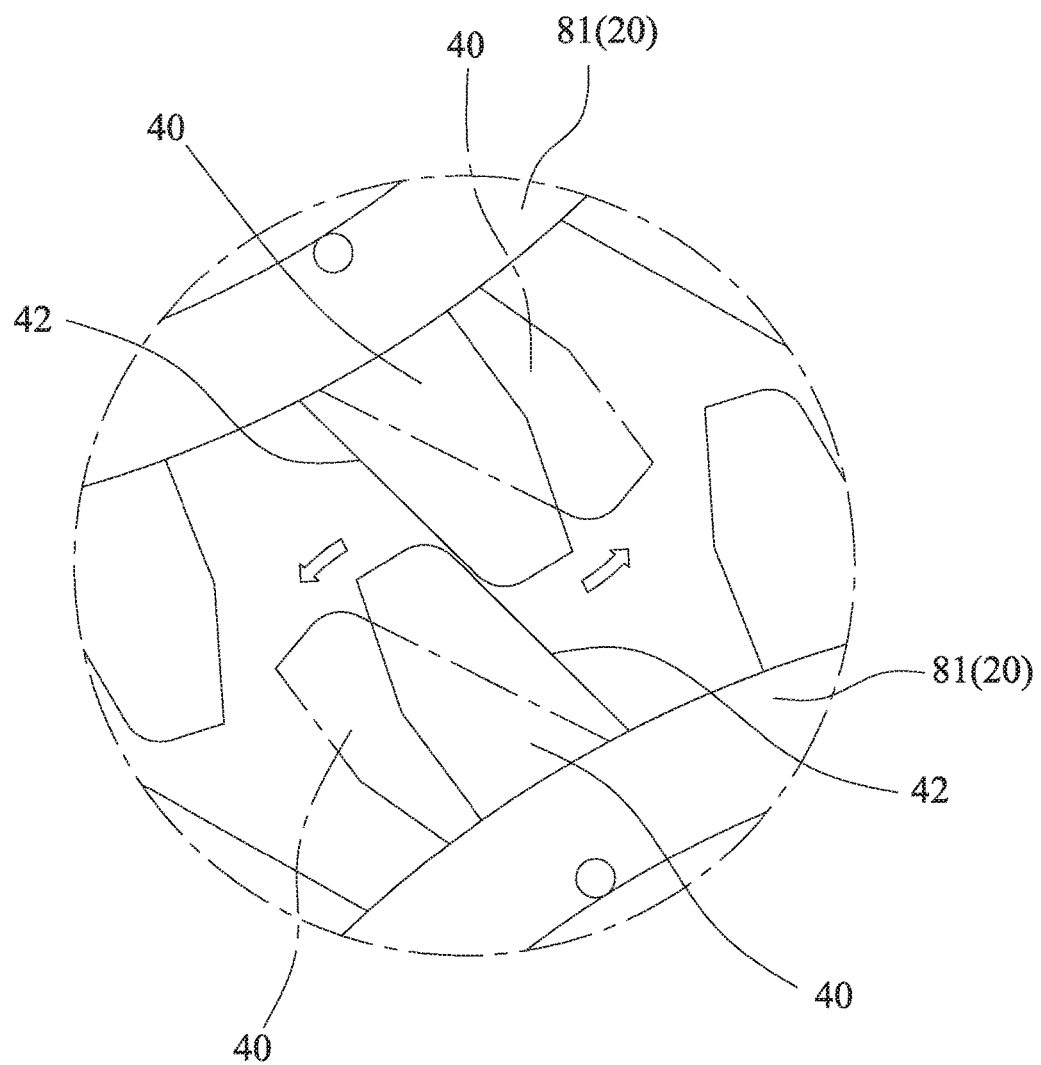
FIG. 10 is a fragmentary, enlarged schematic view illustrating the state when teeth of two driven gears of the gear transmission device are turned to an idle position.

Referring to FIGS. 9 and 10, an embodiment of a gear transmission device 8 includes a driving gear 80 and a plurality of driven gears 81 each meshing with the driving gear 80 to be rotated only in a uni-rotational direction (the counterclockwise direction). The driving gear 80 may be a spur gear which is rotatable in both rotational directions, or a uni-directional drive gear as described hereinbefore. Each of the driven gears 81 is a uni-directional drive gear as described hereinbefore so as to be rotated in the same rotational direction (the counterclockwise direction). FIG. 9 illustrates the example where the driving and driven gears 80, 81 are uni-directional drive gears.

The trailing surface section 43 of each tooth 40 of the driving gear 80 faces the trailing surface section 43 of each tooth of each driven gear 81. When the driving gear 80 rotates in the clockwise direction, the trailing surface sections 43 of the driving and driven gears 80, 81 are subjected to torques so that the driving gear 80 drives the rotation of the driven gears 81 in the counterclockwise direction. When the driving gear 80 rotates in the counterclockwise direction, the leading surface sections 42 of the driving and driven gears 80, 81 face and abut against each other and are subjected to torques to turn the teeth 40 of the driven gears 81 to the idle position, such that the driving gear 80 does not drive rotation of the driven gears 81.

Moreover, two adjacent ones of the driven gears 81 may be disposed to mesh or not mesh with each other. Specifically, when the driven gears 81 are disposed to mesh with each other to render the gear transmission device 8 compact, with reference to FIG. 10, the leading surface section 42 of each tooth 40 of each driven gear 81 is subjected to a torque to turn the teeth 40 of each driven gear 81 to the idle position due to rotation of the driven gears 81 in the counterclockwise direction, so as not to interfere each other.

It is appreciated that, when the driving gear 80 is a spur gear, only rotation of the driving gear 80 in the clockwise direction results in rotation of the driven gears 81 in the counterclockwise direction. That is, when the driving gear 80 rotates in the counterclockwise direction, the leading surface section 42 of each tooth 40 of each driven gear 81 is subjected to a torque to turn the teeth 40 of each driven gear 81 to the idle position, so that the driven gears 81 are not rotated with the driving gear 80.

Figure 11:
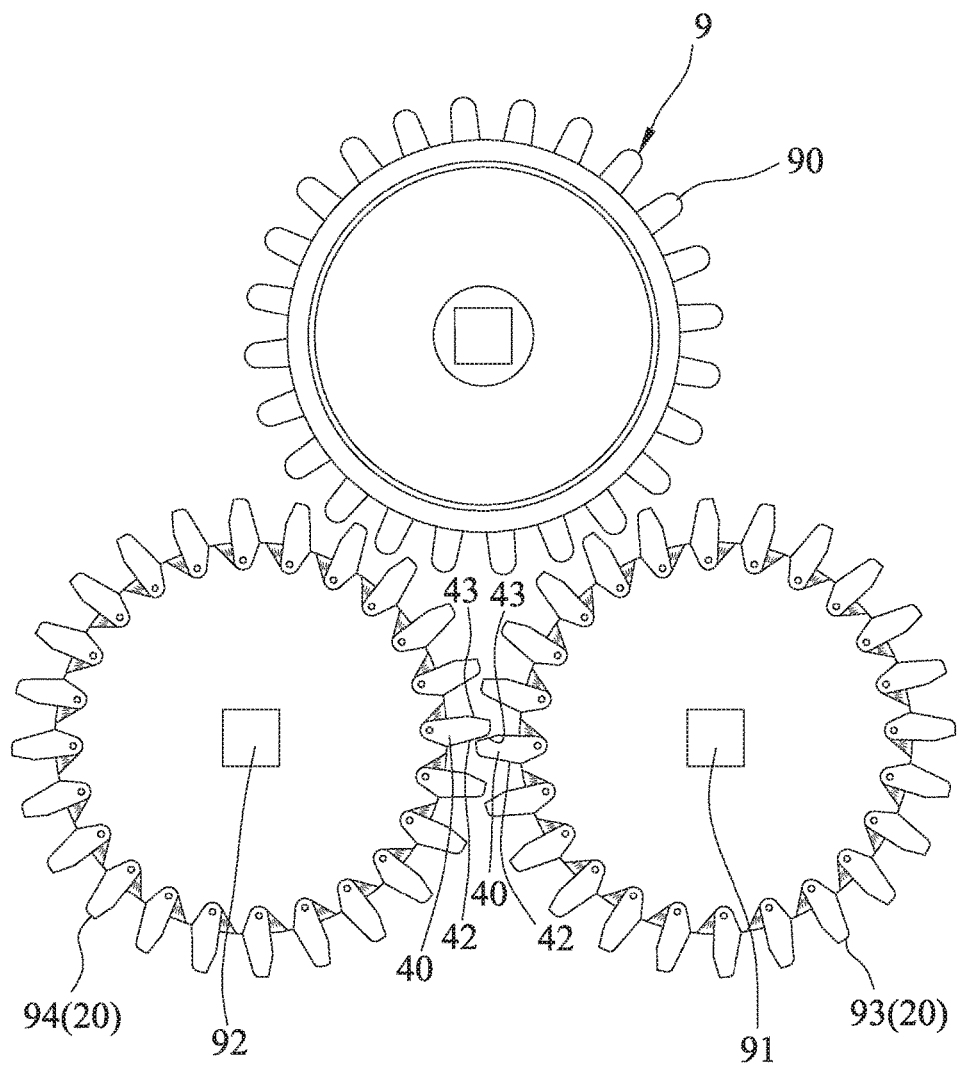
FIG. 11 is a schematic rear view illustrating another embodiment of a gear transmission device according to the disclosure.
Figure 12:
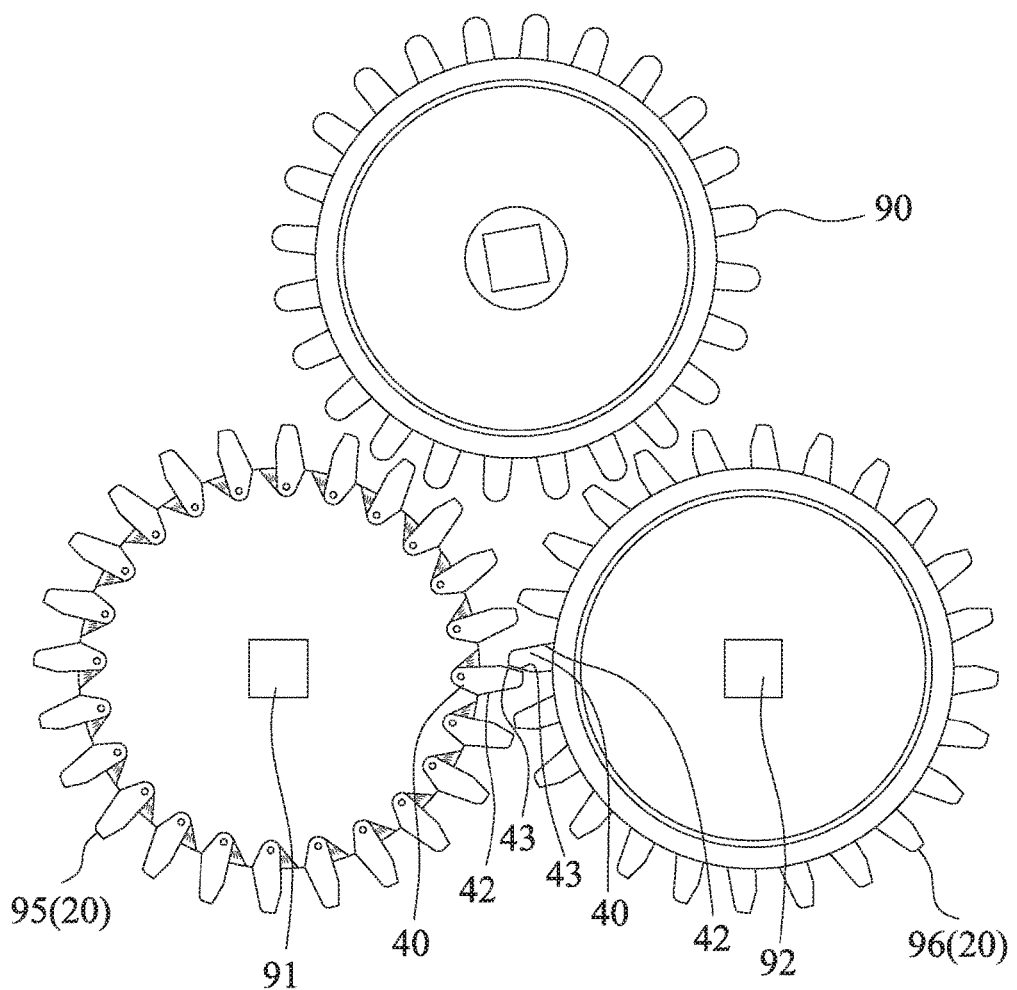
FIG. 12 is a schematic front view of the embodiment of the gear transmission device of FIG. 11.

With reference to FIGS. 11 and 12, another embodiment of the gear transmission device 9 includes a driving gear 90, first and second rotating shafts 91, 92 disposed parallel to each other, a first driven gear 93, a second driven gear 94, a third driven gear 95 and a fourth driven gear 96. The driving gear 90 is a spur gear which is rotatable in both clockwise and counterclockwise directions. Each of the first, second, third and fourth driven gears 93, 94, 95, 96 is a uni-directional drive gear 20 rotated in a uni-rotational direction. That is, the first driven gear 93 is rotated in a counterclockwise direction. Each of the second, third and fourth driven gears 94, 95, 96 is rotated in a clockwise direction.

Specifically, the first driven gear 93 is journalled on the first rotating shaft 91, and meshes with the driving gear 90 to be rotated in the counterclockwise direction. The second driven gear 94 is journalled on the second rotating shaft 92, and meshes with the driving gear 90 to be rotated in the clockwise direction. The leading surface section 42 of each tooth 40 of the second driven gear 94 faces the trailing surface section 43 of each tooth 40 of the first driven gear 93. The third driven gear 95 is journalled on the first rotating shaft 91. The fourth driven gear 96 is journalled on the second rotating shaft 92, and meshes with the third driven gear 95 in an opposite manner such that the trailing surface section 43 of each tooth 40 of the fourth driven gear 96 faces the trailing surface section 43 of each tooth 40 of the third driven gear 95.

When the driving gear 90 rotates in the clockwise direction, the first driven gear 93 is rotated in the counterclockwise direction, and the second driven gear 94 is not rotated neither by the driving gear 90 nor the first driven gear 93. Meanwhile, the third driven gear 95 is rotated in the clockwise direction (seen from the front side) with the first driven gear 93 and the first rotating shaft 91, and the fourth driven gear 96 is not rotated thereby.

When the driving gear 90 rotates in the counterclockwise direction, the second driven gear 94 is rotated in the clockwise direction, and the first driven gear 93 is not rotated neither by the driving gear 90 nor the second driven gear 94. Meanwhile, the fourth driven gear 96 is rotated in the counterclockwise direction (seen from the front side) with the second driven gear 94 and the second rotating shaft 92, and the third driven gear 95 is rotated by the fourth driven gear 96.

Thus, when the driving gear 90 rotates in the clockwise direction, the third driven gear 95 is rotated but the fourth driven gear 96 is not rotated. When the driving gear 90 rotates in the counterclockwise direction, both the third and fourth driven gears 95, 96 are rotated.

Therefore, when the driving gear 90 rotates alternately in the clockwise and counterclockwise directions, as seen from the front side, the third driven gear 95 is rotated continuously in the clockwise direction while the fourth driven gear 96 is rotated intermittently in the counterclockwise direction.

As illustrated, with the teeth 40 turnable relative to the mounting seat 30 between the driving and idle positions, the uni-directional drive gear 20 is rotated in a uni-rotational direction such that the gear transmission device 8, 9 having the uni-directional drive gear 20 can be configured to perform different transmissions to suit a wide variety of requirements.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A uni-directional drive gear comprising:
a mounting seat including a first circular body and a second circular body which are attached to and coaxial with each other along an axis, said second circular body having an outer peripheral surface which surrounds the axis, and a plurality of accommodation bores each of which extends from said outer peripheral surface toward the axis to terminate at a bore bottom, two adjacent ones of said accommodation bores being angularly spaced from each other about the axis by a raised portion, said raised portion having a top surface section at said outer peripheral surface, and a driven surface section and a barrier surface section which are respectively disposed at two opposite sides of said top surface section in a rotational direction and which extend toward the axis to engage said bore bottom;
a plurality of teeth respectively mounted in said accommodation bores, each of said teeth having a tooth top surface section, and leading and trailing surface sections which are respectively disposed at two opposite sides of said tooth top surface section in the rotational direction, said leading surface section facing said driven surface section;
a plurality of pivot pins each extending in a direction of the axis from said first circular body into a respective one of said accommodation bores such that each of said teeth is pivotably mounted on a respective one of said pivot pins to be turnable between a driving position, where said leading surface section abuts against said driven surface section and said accommodation bore has a retreat space between said trailing surface section and said barrier surface section, and an idle position, where said trailing surface section is moved in said retreat space; and
a plurality of biasing members each disposed to bias a respective one of said teeth to the driving position such that a torque applied to said trailing surface section is transmitted by keeping the respective one of said teeth in the driving position to drive rotation of said uni-directional drive gear in the rotational direction, and such that a torque applied to said leading surface section leads to turning of the respective one of said teeth in the retreat space to the idle position.

2. The uni-directional drive gear as claimed in claim 1, wherein each of said biasing members is a compression spring which is disposed in said retreat space and which has two ends abutting against said trailing surface section and said barrier surface section, respectively.

3. The uni-directional drive gear as claimed in claim 1, wherein each of said teeth has a spring receiving space, each of said biasing members being a coil spring which is accommodated in said spring receiving space, which surrounds the respective one of said pivot pins and which has two leg ends that are securely connected to the respective one of said teeth and an adjacent one of said raised portions to provide a biasing force to the respective one of said teeth toward the driving position.

4. The uni-directional drive gear as claimed in claim 1, wherein each of said teeth has a chamfer formed at a corner between said trailing surface section and said tooth top surface section to facilitate meshing engagement with said teeth of another uni-directional drive gear.

5. A gear transmission device comprising:
a driving gear rotatable in a clockwise direction; and
a plurality of driven gears, each being a uni-directional drive gear as claimed in claim 1, and meshing with said driving gear to be rotated by said driving gear in a counterclockwise direction.

6. The gear transmission device as claimed in claim 5, wherein said driving gear is a uni-directional drive gear as claimed in claim 1, said trailing surface section of each of said teeth of said driving gear facing said trailing surface section of each of said teeth of each of said driven gears.

7. The gear transmission device as claimed in claim 5, wherein two adjacent ones of said driven gears mesh with each other, and said leading surface sections of said teeth of the adjacent ones of said driven gears face each other.

8. The gear transmission device as claimed in claim 6, wherein two adjacent ones of said driven gears mesh with each other, and said leading surface sections of said teeth of the adjacent ones of said driven gears face each other.

9. A gear transmission device comprising:
a driving gear rotatable in both clockwise and counterclockwise directions;
a first rotating shaft;
a second rotating shaft disposed parallel to said first rotating shaft;
a first driven gear being a uni-directional drive gear as claimed in claim 1, journalled on said first rotating shaft and meshing with said driving gear to be rotated in the counterclockwise direction;
a second driven gear being a uni-directional drive gear as claimed in claim 1, journalled on said second rotating shaft and meshing with said driving gear to be rotated in the clockwise direction, said leading surface section of each of said teeth of said second driven gear facing said trailing surface section of each of said teeth of said first driven gear;
a third driven gear being a uni-directional drive gear as claimed in claim 1, and journalled on said first rotating shaft; and
a fourth driven gear being a uni-directional drive gear as claimed in claim 1, journalled on said second rotating shaft and meshing with said third driven gear such that said trailing surface section of each of said teeth of said fourth driven gear faces said trailing surface section of each of said teeth of said third driven gear.

* * * * *